United States Patent
Ono et al.

(10) Patent No.: US 10,846,223 B2
(45) Date of Patent: Nov. 24, 2020

(54) CACHE COHERENCY BETWEEN A DEVICE AND A PROCESSOR

(71) Applicant: LENOVO Enterprise Solutions (Singapore) PTE. LTD., New Tech Park (SG)

(72) Inventors: Makoto Ono, Chapel Hill, NC (US); Jonathan R. Hinkle, Raleigh, NC (US); William G. Holland, Cary, NC (US); Randolph S. Kolvick, Durham, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 17 days.

(21) Appl. No.: 15/788,663

(22) Filed: Oct. 19, 2017

(65) Prior Publication Data
US 2019/0121738 A1  Apr. 25, 2019

(51) Int. Cl.
*G06F 13/24* (2006.01)
*G06F 12/0831* (2016.01)
*G06F 13/16* (2006.01)
*G06F 13/42* (2006.01)

(52) U.S. Cl.
CPC ...... *G06F 12/0831* (2013.01); *G06F 13/1673* (2013.01); *G06F 13/24* (2013.01); *G06F 13/4282* (2013.01); *G06F 2212/621* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,796,996 A | * | 8/1998 | Temma | G06F 9/3861 710/260 |
| 6,272,602 B1 | * | 8/2001 | Singhal | G06F 12/0813 711/144 |
| 6,810,470 B1 | * | 10/2004 | Wiseman | G06F 13/1631 711/156 |
| 2001/0007538 A1 | * | 7/2001 | Leung | G06F 12/0893 365/222 |
| 2004/0068616 A1 | * | 4/2004 | Tierney | G06F 12/0822 711/141 |
| 2004/0160446 A1 | * | 8/2004 | Gosalia | G06F 9/4843 345/503 |

(Continued)

*Primary Examiner* — Sean D Rossiter
*Assistant Examiner* — Stephanie Wu
(74) *Attorney, Agent, or Firm* — Kunzler Bean & Adamson; Bruce R. Needham

(57) ABSTRACT

An apparatus for cache coherency between a device and a processor includes a buffer module that buffers data in a non-cache coherent space of an electronic device communicatively coupled to a processor. The apparatus includes an update module that updates at least one identifier with respect to the buffered data. The at least one identifier is stored in a cache coherent space of the electronic device. The apparatus includes a coherence notification module that notifies the processor of a cache incoherence. The cache incoherence indicates that the cache coherent space of the electronic device that includes the updated at least one identifier differs from a cache coherent space of the processor that includes a copy of the at least one identifier prior to the update.

20 Claims, 6 Drawing Sheets

(56) References Cited

U.S. PATENT DOCUMENTS

| | | | |
|---|---|---|---|
| 2005/0177657 A1* | 8/2005 | Pope | G06F 13/385 |
| | | | 710/36 |
| 2005/0185472 A1* | 8/2005 | Randell | G06F 11/1068 |
| | | | 365/185.33 |
| 2006/0080512 A1* | 4/2006 | Hoover | G06F 12/0831 |
| | | | 711/141 |
| 2006/0294314 A1* | 12/2006 | Cheng | G06F 12/082 |
| | | | 711/136 |
| 2007/0073928 A1* | 3/2007 | Bruno | G06F 13/28 |
| | | | 710/46 |
| 2007/0174505 A1* | 7/2007 | Schlansker | G06F 13/28 |
| | | | 710/22 |
| 2009/0327624 A1* | 12/2009 | Tamura | G06F 11/1435 |
| | | | 711/158 |
| 2010/0037028 A1* | 2/2010 | Shen | G06F 12/1027 |
| | | | 711/154 |
| 2010/0146218 A1* | 6/2010 | Langendorf | G06F 12/0831 |
| | | | 711/146 |
| 2012/0017063 A1* | 1/2012 | Hummel | G06F 12/1081 |
| | | | 711/200 |
| 2014/0149682 A1* | 5/2014 | Blaner | G06F 12/0815 |
| | | | 711/141 |
| 2015/0234776 A1* | 8/2015 | Tamir | G06F 15/17331 |
| | | | 709/212 |
| 2015/0255150 A1* | 9/2015 | Kim | G11C 13/004 |
| | | | 365/148 |
| 2016/0246632 A1* | 8/2016 | Tsirkin | G06F 9/45558 |
| 2017/0221173 A1* | 8/2017 | Acharya | G06T 1/20 |
| 2018/0006970 A1* | 1/2018 | Browne | H04L 12/4625 |

* cited by examiner

CACHE COHERENCY BETWEEN A DEVICE AND A PROCESSOR

FIELD

The subject matter disclosed herein relates to cache coherency and more particularly relates to cache coherency between a device and a processor.

BACKGROUND

Communication between electronic devices and processors, such as input/output devices and a CPU within a computer, is typically performed by an electronic device generating an interrupt signal for the processor or by the processor polling the electronic device for data. Either method consumes processor cycles and creates additional input/output bus bandwidth.

BRIEF SUMMARY

An apparatus for cache coherency between a device and a processor is disclosed. A method and computer program product also perform the functions of the apparatus. One embodiment of an apparatus includes a buffer module that buffers data in a non-cache coherent space of an electronic device communicatively coupled to a processor. The apparatus includes an update module that updates at least one identifier with respect to the buffered data. The at least one identifier is stored in a cache coherent space of the electronic device. The apparatus includes a coherence notification module that notifies the processor of a cache incoherence. The cache incoherence indicates that the cache coherent space of the electronic device that includes the updated at least one identifier differs from a cache coherent space of the processor that includes a copy of the at least one identifier prior to the update.

One embodiment of a method for cache coherency between a device and a processor includes buffering data in a non-cache coherent space of an electronic device communicatively coupled to a processor. The method includes updating at least one identifier with respect to the buffered data. The at least one identifier is stored in a cache coherent space of the electronic device. The method includes notifying the processor of a cache incoherence. The cache incoherence indicates that the cache coherent space of the electronic device that includes the updated at least one identifier differs from a cache coherent space of the processor that includes a copy of the at least one identifier prior to the update.

One embodiment of a program product for cache coherency between a device and a processor includes a computer readable storage medium that stores code executable by a processor. The executable code includes code to perform buffering data in a non-cache coherent space of an electronic device communicatively coupled to a processor. The executable code includes code to perform updating at least one identifier with respect to the buffered data. The at least one identifier is stored in a cache coherent space of the electronic device. The executable code includes code to perform notifying the processor of a cache incoherence. The cache incoherence indicates that the cache coherent space of the electronic device that includes the updated at least one identifier differs from a cache coherent space of the processor that includes a copy of the at least one identifier prior to the update.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
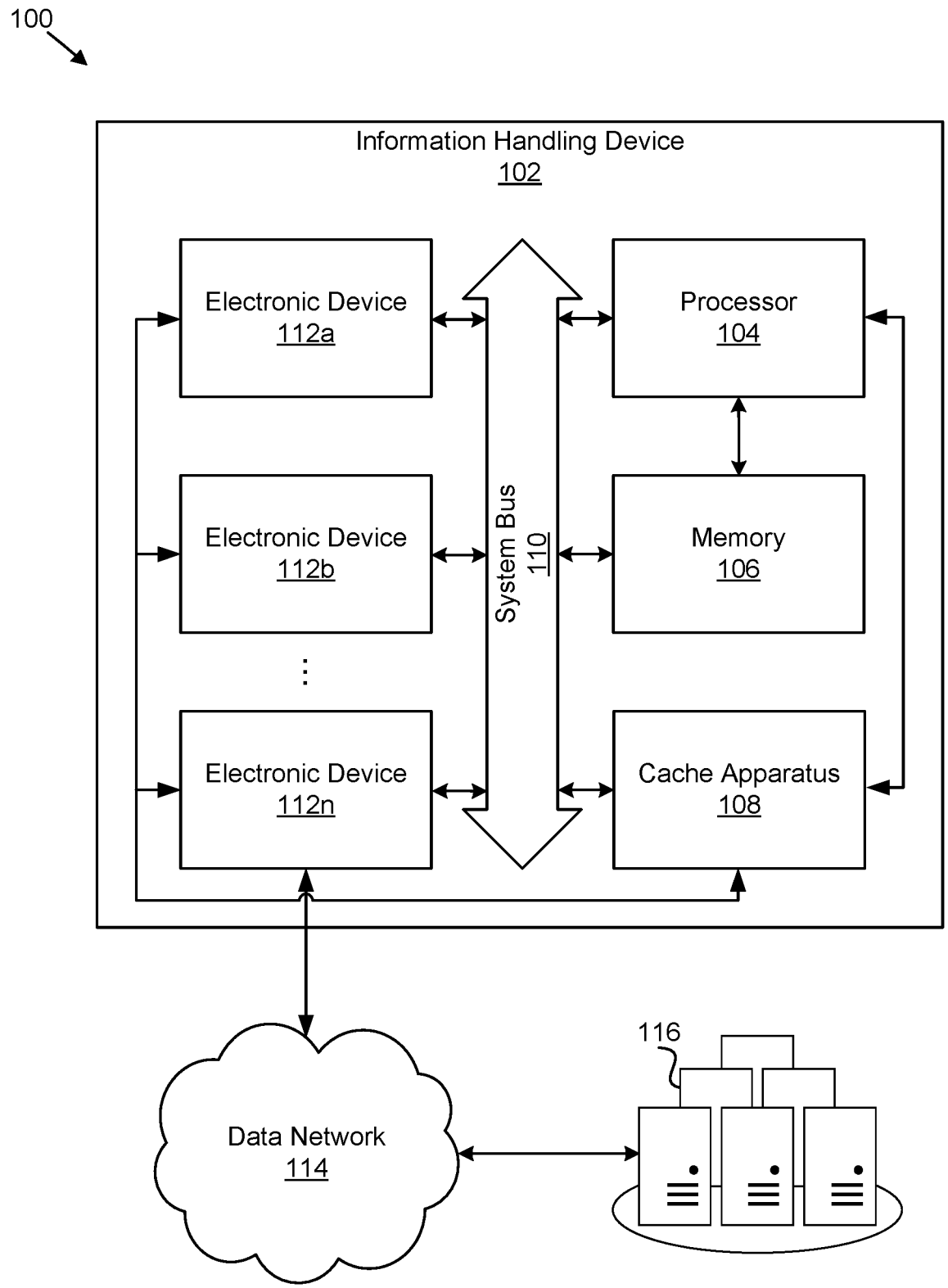
FIG. 1 is a schematic block diagram illustrating one embodiment of a system for cache coherency between a device and a processor.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for cache coherency between a device and a processor is disclosed. A method and computer program product also perform the functions of the apparatus. One embodiment of an apparatus includes a buffer module that buffers data in a non-cache coherent space of an electronic device communicatively coupled to a processor. The apparatus includes an update module that updates at least one identifier with respect to the buffered data. The at least one identifier is stored in a cache coherent space of the electronic device. The apparatus includes a coherence notification module that notifies the processor of a cache incoherence. The cache incoherence indicates that the cache coherent space of the electronic device that includes the updated at least one identifier differs from a cache coherent space of the processor that includes a copy of the at least one identifier prior to the update.

In one embodiment, the coherence notification module notifies the processor of the cache incoherence by sending a message of the cache incoherence to the processor over a snooping protocol. In further embodiments, the message includes a copy of the updated at least one identifier with respect to the buffered data in the non-cache coherent space of the electronic device. In various embodiments, the coherence notification module sends a copy of the updated at least one identifier to the processor in a message that is separate from the cache incoherence message in response to a request from the processor for the updated at least one identifier.

In one embodiment, the non-cache coherent space includes a circular buffer. In some embodiments, the at least one identifier includes a first pointer that refers to a write location in the circular buffer such that data received at the electronic device is written to the write location in the circular buffer indicated by the first pointer. The update module may update the first pointer in the cache coherent space in response to the data being written to the write location. In further embodiments, the coherence notification module notifies the processor of the cache incoherence in response to first pointer being updated.

In one embodiment, the at least one identifier further includes a second pointer that refers to a read location in the circular buffer. The read location may include data for the processor to read in response to the cache incoherence. In certain embodiments, the update module receives a cache incoherence message from the processor over a snooping protocol in response to the processor reading the data at the read location in the circular buffer and updating a copy of the second pointer in the cache coherent space of the processor. The updated second pointer may refer to a next read location in the non-cache coherent space of the electronic device. The update module may further update the second pointer in the cache coherent space of the electronic device with the updated copy of the second pointer stored in the cache coherent space of the processor.

In one embodiment, the buffer module buffers data received from the processor in the same non-cache coherent space of the electronic device that is used to buffer data intended for the processor. In certain embodiments, the buffer module buffers data received from the processor in a second non-cache coherent space of the electronic device that is separate from the non-cache coherent space of the electronic device that is used to buffer data intended for the processor.

In certain embodiments, the update module receives a cache incoherence message from the processor over a snooping protocol in response to the processor updating a second at least one identifier with respect to the buffered data. The second at least one identifier may be stored in a second cache coherent space of the processor that corresponds to the second non-cache coherent space. In further embodiments, the update module updates a copy of the second at least one identifier stored in a second cache coherent space of the electronic device that corresponds to the second non-cache coherent space such that the second cache coherent space of the electronic device is coherent with the second cache coherent space of the processor.

In one embodiment, the non-cache coherent space includes a first-in-first-out stack. In various embodiments, the at least one identifier includes a first pointer that refers to a next read location in the stack for the processor to read data from, and a second pointer that refers to a next write location in the stack for the electronic device to write data to. The first and second pointers may be stored in the cache coherent space of the electronic device.

In one embodiment, the electronic device includes a peripheral component interconnect express ("PCIe") device. In further embodiments, the electronic device includes an input/output ("I/O") device selected from the group consisting of a network interface card, a video card, and a storage device.

One embodiment of a method for cache coherency between a device and a processor includes buffering data in a non-cache coherent space of an electronic device communicatively coupled to a processor. The method includes updating at least one identifier with respect to the buffered data. The at least one identifier is stored in a cache coherent space of the electronic device. The method includes notifying the processor of a cache incoherence. The cache incoherence indicates that the cache coherent space of the electronic device that includes the updated at least one identifier differs from a cache coherent space of the processor that includes a copy of the at least one identifier prior to the update.

In one embodiment, notifying the processor of the cache incoherence includes sending a message of the cache incoherence to the processor over a snooping protocol. The message may include a copy of the updated at least one identifier with respect to the buffered data in the non-cache coherent space of the electronic device.

In one embodiment, the non-cache coherent space includes a circular buffer. In some embodiments, the at least one identifier includes a first pointer that refers to a write location in the circular buffer such that data received at the electronic device is written to the write location in the circular buffer indicated by the first pointer. The first pointer in the cache coherent space may be updated in response to the data being written to the write location. In certain embodiments, the processor is notified of the cache incoherence in response to first pointer being updated.

In one embodiment, the at least one identifier further includes a second pointer that refers to a read location in the circular buffer. The read location may include data for the processor to read in response to the cache incoherence. In further embodiments, the method includes receiving a cache incoherence message from the processor over a snooping protocol in response to the processor reading the data at the read location in the circular buffer and updating a copy of the second pointer in the cache coherent space of the processor. The updated second pointer may refer to a next read location in the non-cache coherent space of the electronic device. In some embodiments, the method includes updating the second pointer in the cache coherent space of the electronic device with the updated copy of the second pointer stored in the cache coherent space of the processor.

In one embodiment, the method includes buffering data received from the processor in a second non-cache coherent space of the electronic device that is separate from the non-cache coherent space of the electronic device that is used to buffer data intended for the processor. In further embodiments, the method includes receiving a cache incoherence message from the processor over a snooping protocol in response to the processor updating a second at least one identifier with respect to the buffered data. The second at least one identifier may be stored in a second cache coherent space of the processor that corresponds to the second non-cache coherent space. In some embodiments, the method includes updating a copy of the second at least one identifier stored in a second cache coherent space of the electronic device that corresponds to the second non-cache coherent space such that the second cache coherent space of the electronic device is coherent with the second cache coherent space of the processor.

One embodiment of a program product for cache coherency between a device and a processor includes a computer readable storage medium that stores code executable by a processor. The executable code includes code to perform buffering data in a non-cache coherent space of an electronic device communicatively coupled to a processor. The executable code includes code to perform updating at least one identifier with respect to the buffered data. The at least one identifier is stored in a cache coherent space of the electronic device. The executable code includes code to perform notifying the processor of a cache incoherence. The cache incoherence indicates that the cache coherent space of the electronic device that includes the updated at least one identifier differs from a cache coherent space of the processor that includes a copy of the at least one identifier prior to the update.

FIG. 1 is a schematic block diagram illustrating one embodiment of a system 100 for cache coherency between a device and a processor. In one embodiment, the system 100 includes an information handling device 102, which includes a processor 104 communicatively coupled to a memory 108, a cache apparatus 108, and one or more electronic devices 112a-n that are each communicatively coupled over a system bus 114. The system 100, in certain embodiments, include a data network 114 and one or more endpoints 108 (e.g., servers) that are communicatively coupled to the information handling device 102 over the data network 114. In certain embodiments, even though a specific number of information handling devices 102, processors 104, memory 108, cache apparatuses 108, electronic devices 112a-n, data networks 106, and endpoints 108 are depicted in FIG. 1, one of skill in the art will recognize, in light of this disclosure, that any number of the foregoing may be included in the system 100.

The information handling device 102, in one embodiment, includes one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

The processor 104, in one embodiment, includes a central processing unit ("CPU") for the information handling device 102. The processor 104 may be configured as a microprocessor. The processor 104 may be a multi-core processor that includes multiple different processing cores on a single processing unit. Each processor 104 and/or processing core may be communicatively coupled to a memory 106. The memory 106, in one embodiment, includes volatile memory such as random-access memory ("RAM"), virtual memory, RAM disk, shadow RAM, registers, caches (either on the same die as the processor 104 and/or external to the processor 104), and/or the like.

In one embodiment, the electronic devices 112a-n (collectively 112) are capable of communicating with the processor 104 to send and/or receive data to/from the processor 104. The data may be generated by the electronic device itself, received from an endpoint 116, and/or another device within the information handling device 102. The electronic devices 112 may include input/output ("I/O") devices such as peripheral component interconnect ("PCI") devices, PCI express ("PCIe") devices, serial devices, serial AT attachment ("SATA") devices, external devices (e.g., external SATA (eSATA) devices), universal serial bus ("USB") devices, and/or the like), and/or the like. The electronic devices 112 may include network devices (e.g., a wired or wireless network interface card ("NIC")), a video graphics card, a storage device (e.g., a hard drive, a flash device, and/or other non-volatile media device), a sound card, an input device interface (e.g., a mouse or keyboard device interface), and/or the like.

In various embodiments, the cache apparatus 108 is configured to buffer data in a non-cache coherent space of an electronic device 112, such as the electronic devices 112 that is communicatively coupled to a processor 104. The cache apparatus 108, in further embodiments, updates at least one identifier with response to the buffered data. The at least one identifier is stored in a cache coherent space of the electronic device 112. In various embodiments, the cache apparatus 108 notifies the processor 104 of a cache incoherence, which indicates that the cache coherent space of the electronic device 112 that includes the updated at least one identifier differs from the cache coherent space of the processor 104 that includes a copy of the at least one identifier prior to the update.

The cache apparatus 108, in one embodiment, provides an improvement over conventional methods for notifying a processor 104 that data is available to be accessed or read on an electronic device 112, and for notifying an electronic device 112 that the processor 104 has written data to the electronic device 112, by using cache coherence. As used herein, in some embodiments, cache coherence refers to the uniformity of shared resource data that is stored in multiple local caches, such as a local cache for an electronic device 112 and a local cache for a processor 104. Conventional methods of notification may include the processor 104 polling the electronic device 112 at intervals to determine if data is available to read from the electronic device 112, which consumes processor cycles and I/O bus bandwidth. Another method may include the electronic device 112 triggering an interrupt signal when data is available for the processor 104 that may cause the processor 104 to switch contexts and run an interrupt handler to access the data from the electronic device 112, which consumes processor cycles by causing the processor 104 to switch tasks to read the data. Unlike conventional methods, the subject matter disclosed herein uses cache coherency between electronic devices 112 and the processor 104 to provide notifications of changed data on the electronic devices 112, which eliminates the need for interrupt signals and/or polling and is more efficient in terms of processor cycles and I/O bandwidth, and therefore improves the efficiency and performance of the information handling device 102. The cache apparatus 108 is described in more detail below with reference to FIG. 3.

In various embodiments, the cache apparatus 108 may be embodied as a hardware appliance that can be installed or deployed on, or otherwise connected to, an information handling device 102. In certain embodiments, the cache apparatus 108 may include a hardware device such as a secure hardware dongle or other hardware appliance device (e.g., a set-top box, a network appliance, or the like) that attaches to a device such as a laptop computer, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, a video graphics array ("VGA") port, a digital visual interface ("DVI") port, or the like); and/or the like. A hardware appliance of the cache apparatus 108 may include a power interface, a wired and/or wireless network interface, a graphical interface that attaches to a display, and/or a semiconductor integrated circuit device as described below, configured to perform the functions described herein with regard to the cache apparatus 108.

The cache apparatus 108, in one embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the cache apparatus 108 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the cache apparatus 108.

The semiconductor integrated circuit device or other hardware appliance of the cache apparatus 108, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the cache apparatus 108 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The various components 104-112 of the information handling device 102 may be communicatively coupled to one another over a system bus 110. For instance, the processor 104 may read data from an electronic device 112 over the system bus 110. Similarly, the electronic devices 112 may send messages to the processor 104, such as cache incoherence messages over the system bus 110. The system bus 110 may include a PCI bus, an accelerated graphics port ("AGP") bus, a personal computer memory card industry association ("PCMCIA") bus, an industry standard architecture ("ISA") bus, and/or the like.

The data network 114, in one embodiment, includes a digital communication network that transmits digital communications. The data network 114 may include a wireless network, such as a wireless cellular network, a local wireless network, such as a Wi-Fi network, a Bluetooth® network, a near-field communication ("NFC") network, an ad hoc network, and/or the like. The data network 114 may include a wide area network ("WAN"), a storage area network ("SAN"), a local area network ("LAN"), an optical fiber network, the internet, or other digital communication network. The data network 114 may include two or more networks. The data network 114 may include one or more servers, routers, switches, bridges, and/or other networking equipment. The data network 114 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization (ISO), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® (IrDA®). Alternatively, the wireless connection may be a cellular telephone network communication. All standards and/or connection types include the latest version and revision of the standard and/or connection type as of the filing date of this application.

The one or more endpoints 116, in one embodiment, may be devices that are communicatively coupled to the information handling device 102 over the data network 114. The endpoints 116 may be located remote to the information handling device 102 such as in a data center accessible via the internet, on an intranet, and/or the like. The endpoints 116 may be embodied as blade servers, mainframe servers, tower servers, rack servers, and/or the like. The endpoints 116 may be configured as mail servers, web servers, application servers, FTP servers, media servers, data servers, web servers, file servers, virtual servers, and/or the like.

Figure 2:
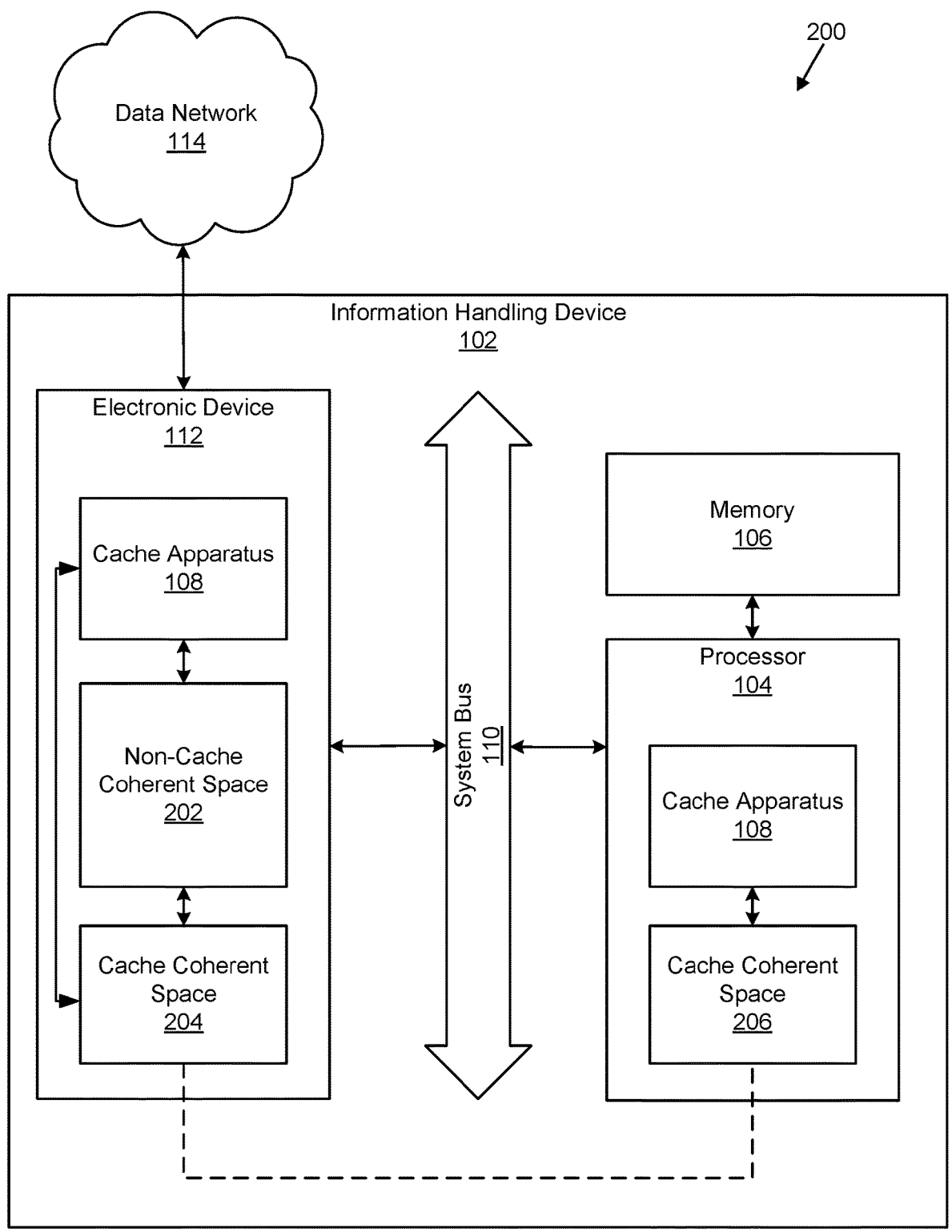
FIG. 2 is a schematic block diagram illustrating one embodiment of another system for cache coherency between a device and a processor.

FIG. 2 depicts one embodiments of another system 200 for cache coherency between a device and a processor. In one embodiment, the system 200 may be substantially similar to the system 100 described above with reference to FIG. 1. For clarity, only one electronic device 112 is depicted. In one embodiment, the system 200 includes an information handling device 102 that includes a processor 104 communicatively coupled to memory 106, an electronic device 112, a system bus 110 communicatively coupling the electronic device 112 and the processor 104, cache apparatuses 108, and a data network 114 that is communicatively coupled to the information handling device 102.

In one embodiment, the electronic device 112 includes a non-cache coherent space 202 that is allocated and used to store data that is intended for the processor 104 (e.g., data received from the data network 114), data that is intended for the electronic device 112 (e.g., data from the processor 104), and/or the like. The non-cache coherent space 202 may include a communication buffer, or other data structure, for storing data. The non-cache coherent space 202 may be in an addressable space of a volatile or non-volatile memory space of the electronic device 112.

In various embodiments, the electronic device 112 includes a cache coherent space 204 that is used to store one or more identifiers, e.g., registers, pointers, data, and/or the like, that reference the data stored in the non-cache coherent space 202 of the electronic device 112. The processor 104, in one embodiment, also includes a cache coherent space 206 that corresponds to the cache coherent space 204 of the electronic device 112. In such an embodiment, the cache coherent space 206 of the processor 104 stores copies of the one or more identifiers stored in the cache coherent space 204 of the electronic device 112. In certain embodiments, the cache apparatus 108 maintains the cache coherency between the cache coherent space 204 of the electronic device 112 and the cache coherent space 206 of the processor 104.

For instance, when the electronic device 112 receives data and stores the data at a location in the non-cache coherent space 202 of the electronic device 112, the cache apparatus 108 may update an identifier that is stored in the cache coherent space 204 for the data in the non-cache coherent space 202. When the cache apparatus 108 updates the identifier, this causes a cache incoherence between the data stored in the cache coherent space 204 of the electronic device 112 and the cache coherent space 206 of the processor 104. Accordingly, the cache apparatus 108 may send a cache incoherence message to the processor 104 to notify the processor 104 that its copy of the identifier stored in the cache coherent space 206 of the processor 104 is not up-to-date, e.g., there's a cache incoherence between the cache coherent space 206 of the processor 104 and the cache coherent space 204 of the electronic device 112.

In response to receiving the cache incoherence message, the processor 104, e.g., the cache apparatus 108 on the processor 104, may access the data that is stored at the non-cache coherent space 202 on the electronic device 112 over the system bus 110, and receive an updated copy of the identifier from the cache coherent space 204 of the electronic device 112. The cache apparatus 108 may store the updated copy of the identifier in the cache coherent space 206 of the processor 104 such that the identifier in the cache coherent space 206 of the processor 104 is the same as the identifier in the cache coherent space 204 of the electronic device 112. In this manner, cache coherency can be used to notify the processor 104 and/or the electronic device 112 of available data on the electronic device 112 without requiring the processor 104 to poll at periodic intervals and without requiring the electronic device 112 to trigger an interrupt signal to notify the processor 104 that data is available, which reduces I/O bandwidth over the system bus 110 and processing cycles.

Furthermore, utilizing a combination of a non-cache coherent space 202 and a separate cache coherent space 204 on the electronic device allows large amounts of data to be stored in the non-cache coherent space 202 and a relatively small identifier for the data in the cache coherent space 204, which may be important when using cache coherency because cache coherency maintenance, e.g., keeping the cache coherent space 204 of the electronic device 112 in sync with the cache coherent space 206 of the processor 104 (and vice versa) generates traffic, e.g., snooping traffic between the electronic device 112 and the processor 104 over the system bus 110. Therefore, the subject matter disclosed herein reduces the amount of overhead on the system bus 110 due to snooping traffic by reducing the amount of data stored in the cache coherent spaces 204, 206, and consequently the number of data changes in the cache coherent spaces 204, 206.

Figure 3:
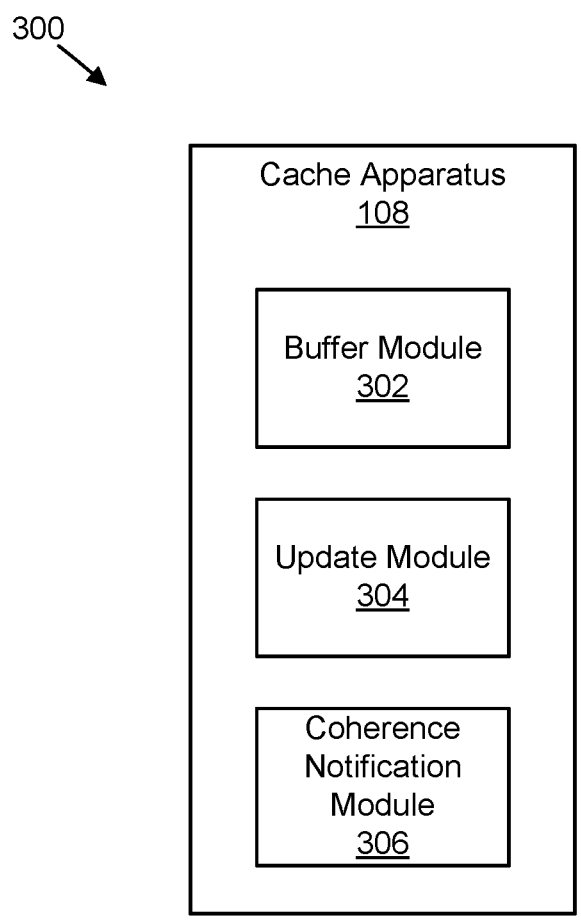
FIG. 3 is a schematic block diagram illustrating one embodiment of an apparatus for cache coherency between a device and a processor.

FIG. 3 depicts one embodiment of an apparatus 300 for cache coherency between a device and a processor. The apparatus 300 includes an embodiment of a cache apparatus 108. The cache apparatus 108 includes a buffer module 302, an update module 304, and a coherence notification module 306, which are described in more detail below.

In one embodiment, the buffer module 302 is configured to buffer data in a non-cache coherent space 202 of an electronic device 112 that is communicatively coupled to a processor 104. For example, if the electronic device 112 is a network card, the buffer module 302 may buffer data received over a data network 114 from an endpoint 116 on the data network 114 at an address or location in the non-cache coherent space 202 of the network card. Similarly, the buffer module 302 may buffer data received from the processor 104 that is intended for an endpoint 116 on the data network 104 at a location in the non-cache coherent space 202 of the electronic device 112.

In some embodiments, the update module 304 is configured to update at least one identifier with respect to the data that the buffer module 302 stored in the non-cache coherent space 202. In certain embodiments, the at least one identifier is stored in the cache coherent space 204 of the electronic device 112. In a further embodiment, a copy of the at least one identifier is stored in the cache coherent space 206 of the processor 104 such that the cache coherent spaces 204, 206 store the same copies of the identifiers when the cache coherent spaces 204, 206 are in a coherent state. The at least one identifier, for example, may include a pointer, a register, an address, a flag, a bit, and/or the like.

In one embodiment, the coherence notification module 306 is configured to notify the processor 104, and/or the electronic device 112 that includes the non-cache coherent space 202, that the cache coherent space 204 of the electronic device 112 is different than the cache coherent space 206 of the processor 104. In other words, the coherence notification module 306 notifies the processor 104 and/or the electronic device 112 that there is a cache incoherence between the cache coherent spaces 204, 206. In one embodiment, the cache incoherence is due to the update module 304 updating the identifier stored in the cache coherent space 204 of the electronic device 112 when the buffer module 302 buffers data in the non-cache coherent space 202 of the electronic device 112 such that the cache coherent space 206 of the processor 104 stores a copy of the identifier prior to the identifier being updated.

In one embodiment, the coherence notification module 306 notifies the processor 104 of the cache incoherence by sending a message of the cache incoherence to the processor 104 over a cache coherent interconnect protocol, a cache snooping protocol, and/or the like. In certain embodiments, a cache coherent interconnect protocol is a standard that defines the specification for implementing cache coherency between electronic devices 112, e.g., I/O devices for an information handling device 102 and processors 104 for the information handling device 102. For instance, the cache coherent interconnect protocol may enable hardware accelerators on electronic devices 112 to maintain cache coherency with processors 104. The cache coherent interconnect protocol may utilize a snooping protocol such as a write-invalidate protocol, where a write to one cache coherent space triggers invalidating data in corresponding cache coherent spaces, or a write-update protocol, where the new data is broadcast to other cache coherent spaces over the system bus 110 without first issuing an invalidation signal. Examples of cache coherent interconnect protocols/standards may include the coherent accelerator processor interface ("CAPI") by IBM®, OpenCAPI™, cache coherent interconnect for accelerators ("CCIX™"), and/or the like.

In one embodiment, the update module 304 and/or the coherence notification module 306 that are located on the processor 104 may snoop the system bus 110 for a cache incoherence message. A cache incoherence message that is snooped from the system bus 110 may indicate that there is a cache incoherence between the cache coherent spaces 204, 206, which further indicates that there is data available in the non-cache coherent space 202 for the processor 104 to read, e.g., a write-invalidate or a write-update message. In some embodiments, the cache incoherence message includes a copy of the updated identifier that the processor 104 stores in its cache coherent space 206, and which also provides the address or location within the non-cache coherent space 202 of the available data. In further embodiments, the cache notification module 306 at the electronic device 112 sends a copy of the updated identifier to the processor 104 in a separate message than the cache incoherence message in response to a request from the processor 104 for the copy of the updated identifier. In further embodiments, the processor 104 reads the updated identifier from memory mapped I/O.

In one embodiment, the non-cache coherent space 202 on the electronic device 112 is configured as a circular buffer, circular queue, or ring buffer that allows data to be stored in a data structure that logically appears to have no beginning or end. In such an embodiment, the identifier includes a tail pointer (a first pointer) that refers to, points to, or the like a write location in the circular buffer such that data that is received at the electronic device 112 is written to the write location in the circular buffer indicated by the tail pointer. Thus, in one embodiment, the update module 304 updates the copy of the tail pointer in the cache coherent space 204 of the electronic device 112 in response to data being written to the write location in the circular buffer.

Accordingly, the coherence notification module 306 may send a cache incoherence message to the processor 104 to notify the processor 104 that the tail pointer has been updated and that there is now a cache incoherence between the cache coherent spaces 204, 206. In some embodiments, the cache coherent space 204 of the electronic device 112 further stores a top pointer (a second pointer) that refers to or points to a read location in the circular buffer, which may be the current read location for the processor 104 to read data from. For example, the circular buffer may act as a first-in-first-out data structure such that the top pointer refers to the oldest data that was written to and is available to read in the circular buffer. The cache coherent space 206 of the processor 104, in certain embodiments, also stores a copy of the top pointer.

In such an embodiment, when the processor 104 reads data at the read location indicated by the top pointer, the update module 304 at the electronic device 112 receives a cache incoherence message from the processor 104 over the snooping protocol. For instance, after the processor 104 reads the data at the read location indicated by the top pointer, the update module 304 updates the top pointer to the next available read location within the circular buffer, and stores a copy of the updated top pointer in the cache coherent space 206 of the processor 104, which creates a cache incoherency with the cache coherent space 204 of the electronic device 112. Accordingly, the coherence notification module 306 at the processor 104 sends an incoherence message to the electronic device 112 over the snooping protocol. The update module 304 at the electronic device 112 receives or snoops the incoherence message from the system bus 110 and updates the copy of the top pointer in the cache coherent space 204 of the electronic device 112 to be the same as the copy of the top pointer in the cache coherent space 206 of the processor 104.

In certain embodiments, when the processor 104 initially communicates with the electronic device 112, the processor 104 reads the values of the identifiers, e.g., the top and tail pointers from the cache coherent space 204 of the electronic device 112 and stores the values in the cache coherent space 206 of the processor 104 so that the cache coherent spaces 204, 206 are initially in coherence prior to data being written to the non-cache coherent space 202. In this manner, it is not necessary for the processor 104 to periodically poll the electronic device 112 for available data, which takes processor cycles and I/O bandwidth. Similarly, the electronic device 112 does not send or generate an interrupt signal to notify the processor 104 that data is available, which may increase device latency. Instead, the processor 104 snoops the system bus 110 for a cache incoherence message from the electronic device 112, which indicates that data is available in the non-cache coherent space 202 of the electronic device 112.

In various embodiments, the buffer module 302 receives and stores data from the processor 104 to store in the non-cache coherent space 202 of the electronic device 112. For example, the buffer module 302 may receive and store data from the processor 104 at a write location indicated by the tail pointer in the circular buffer. In such an embodiment, the update module 204 updates the copy of the tail pointer in the cache coherent space 206 for the processor 104 (e.g., to point to the next available write location), which generates a cache incoherency between the cache coherent spaces 204, 206. Accordingly, the coherence notification module 306 at the processor 104 generates an incoherence message and sends the incoherence message to the electronic device 112 over the snooping protocol, which triggers the update module 304 at the electronic device 112 to update its copy of the tail pointer.

Furthermore, in response to the incoherence message, the electronic device 112 reads or accesses the data from the processor 104 that is stored in the non-cache coherent space 202 of the electronic device 112. Accordingly, when the electronic device 112 reads or accesses the data, the update module 304 updates the top pointer for the circular buffer, which points to the current read location, to point to the next read location. The updated top pointer may be copied to the cache coherent space 204 of the electronic device 112, which triggers a cache incoherency between the cache coherent spaces 204, 206. Accordingly, the coherence notification module 306 generates and sends an incoherence message to the processor 104 over the snooping protocol, which triggers the update module 304 at the processor 104 to update its copy of the top pointer so that the cache coherent spaces 204, 206 are in coherence.

Thus, in one embodiment, the electronic device 112 and the processor 104 write and read data to the same non-cache coherent space 202 of the electronic device 112, and manipulate various pointers or other data indicators to reference current read and write locations within the non-cache coherent space 202. In certain embodiments, the electronic device 112 includes a second non-cache coherent space that is used to buffer data received from the processor 104, and is separate from the non-cache coherent space 202 that is used to buffer data that is intended for the processor 104. In further embodiments, the electronic device 112 includes a second cache coherent space that corresponds to a second cache coherent space of the processor 104 and is used to store identifiers for the data stored in the second non-cache coherent space of the electronic device 112.

In such an embodiment, the update module 304 receives a cache incoherence message from the processor 104 over the snooping protocol in response to the processor 104 updating a second identifier with respect to the buffered data. The second identifier, in one embodiment, is stored in a second cache coherent space of the processor 104 that corresponds to the second non-cache coherent space. For example, the second non-cache coherent space may include a circular buffer, as described above, and therefore when the buffer module 302 writes data from the processor 104 to the second non-cache coherent space, the update module 304 updates the tail pointer at the second cache coherent space of the processor 104, which triggers a cache incoherence between the second cache coherent space of the electronic device 112 and the second cache coherent space of the processor 104. In response to the cache incoherence, the coherence notification module 306 generates a sends an incoherence message to the electronic device 112 over the snooping protocol.

In further embodiments, the update module 304 updates a copy of the identifier, e.g., the tail pointer, stored in the second cache coherent space of the electronic device 112 that corresponds to the second non-cache coherent space such that the second cache coherent space of the electronic device 112 is coherent with the second cache coherent space of the processor 104. In this manner, the cache coherency is bi-directional, meaning that the electronic device 112 and/or the processor 104 can write data to the non-cache coherent space 202 of the electronic device 112, whether it is in a single non-cache coherent space 202, or multiple non-cache coherent spaces, with each non-cache coherent space corresponding to a processor 104, processor core, and/or the like. Regardless, writing data to a non-cache coherent space 202 may cause a cache incoherence between the cache coherent spaces 204, 206 between the electronic device 112 and the processor 104, which triggers notifying the electronic device 112 or the processor 104, respectively, of a cache incoherence and alerts the electronic device 112 or the processor 104 that data is available to access from the non-cache coherent space(s) 202 of the electronic device 112.

In one embodiment, as described above, the non-cache coherent space 202 may be a circular buffer embodied as a linked list. Other data structures may be used such as queues, stacks, and/or the like. For example, the non-cache coherent space 202 may be a first-in-first-out stack such that the identifier stored in the cache coherent space 204 includes a first pointer that refers to a next read location in the stack for the processor 104 to read data from, and a second pointer that refers to a next write location in the stack for the electronic device 112 to write data to.

Figure 4:
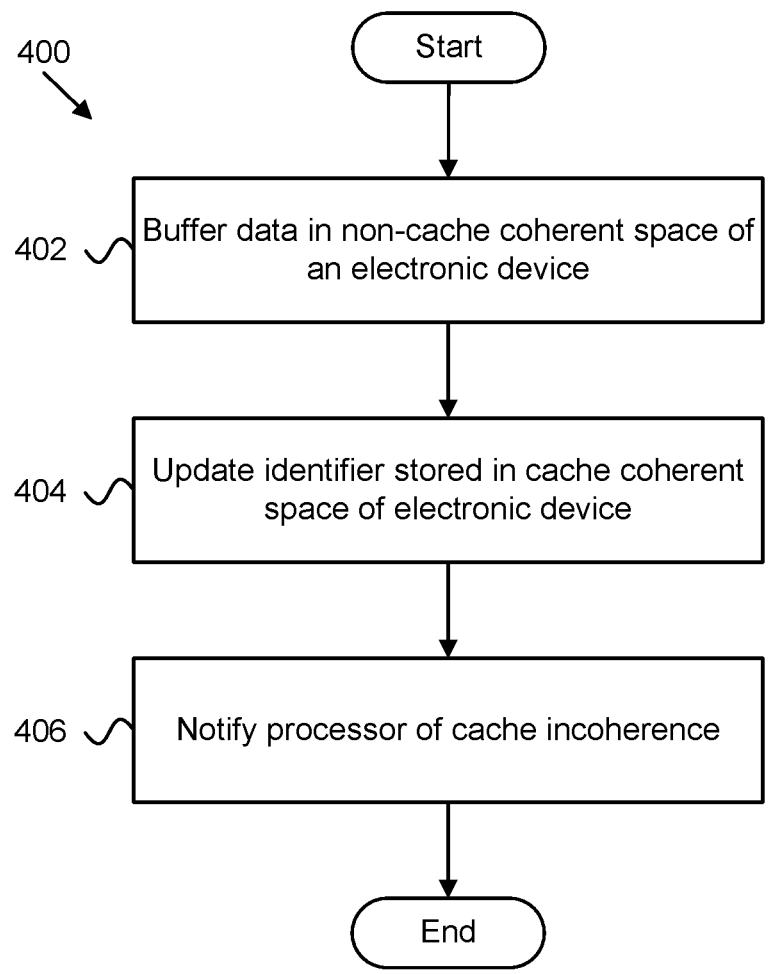
FIG. 4 is a schematic flow chart diagram illustrating one embodiment of a method for cache coherency between a device and a processor.

FIG. 4 depicts one embodiment of a method 400 for cache coherency between a device and a processor. In one embodiment, the method 400 begins and buffers 402 data in a non-cache coherent space 202 of an electronic device 112 that is communicatively coupled to a processor 104. In further embodiments, the method 400 updates 404 at least one identifier with respect to the buffered data. The at least one identifier may be stored in a cache coherent space 204 of the electronic device 112. In certain embodiments, the method 400 notifies 406 the processor 104 of a cache incoherence. The cache incoherence may indicate that the cache coherent space 204 of the electronic device 112 that includes the updated at least one identifier differs from a cache coherent space 206 of the processor 104 that includes a copy of the at least one identifier prior to the update, and the method 400 ends. In one embodiment, the buffer module 302, the update module 304, and the coherence notification module 306 perform the various steps of the method 400.

Figure 5:
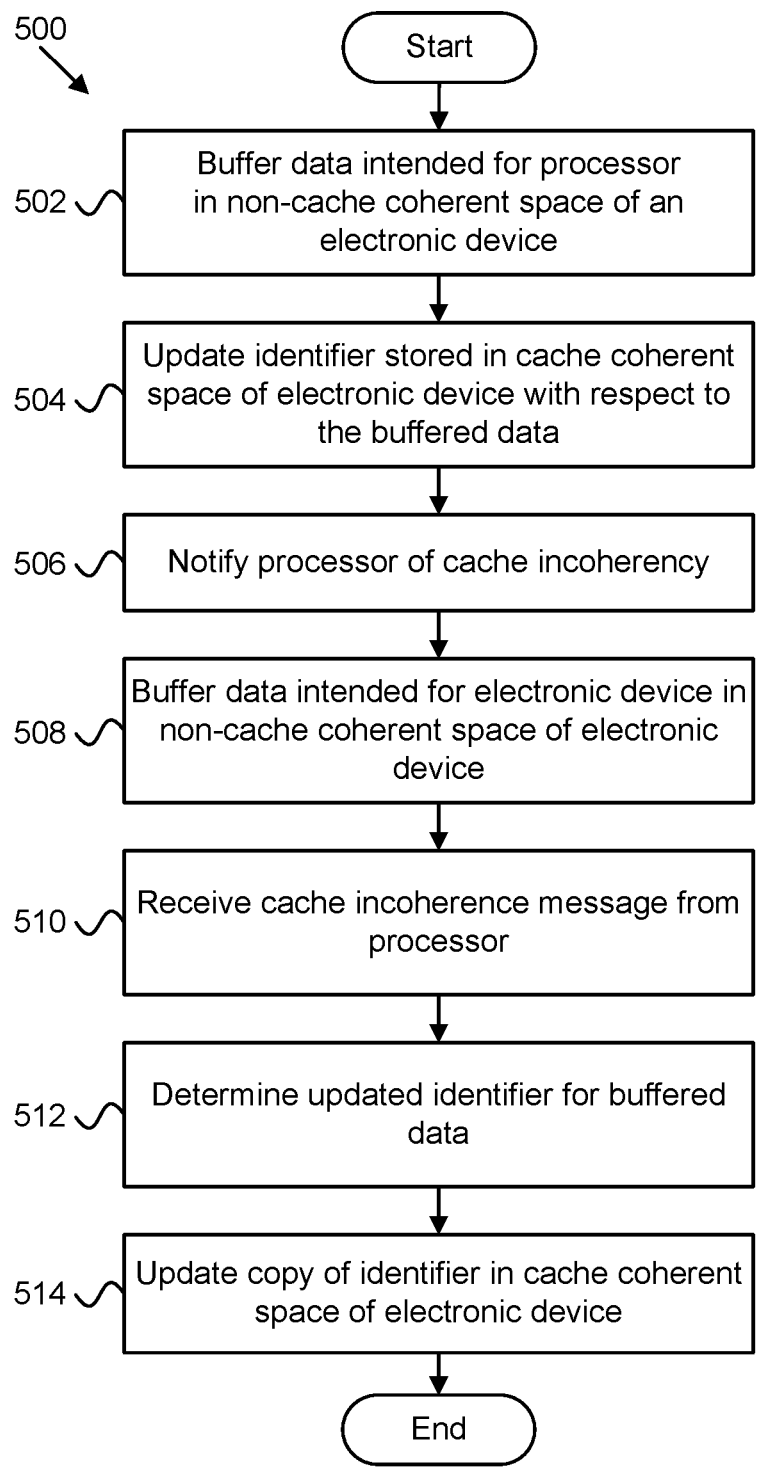
FIG. 5 is a schematic flow chart diagram illustrating one embodiment of another method for cache coherency between a device and a processor.

FIG. 5 depicts one embodiment of a method 500 for cache coherency between a device and a processor. In one embodiment, the method 500 begins and buffers 502 data intended for a processor 104 in a non-cache coherent space 202 of an electronic device 112 that is communicatively coupled to the processor 104. In further embodiments, the method 500 updates 504 at least one identifier with respect to the buffered data. The at least one identifier may be stored in a cache coherent space 204 of the electronic device 112. In certain embodiments, the method 500 notifies 506 the processor 104 of a cache incoherence. The cache incoherence may indicate that the cache coherent space 204 of the electronic device 112 that includes the updated at least one identifier differs from a cache coherent space 206 of the processor 104 that includes a copy of the at least one identifier prior to the update.

In one embodiment, the method 500 buffers 508 data that is intended for the electronic device 112 in the non-cache coherent space 202 of the electronic device 112. In some embodiments, the method 500 receives 510 a cache incoherence message from the processor 104. The method, in certain embodiments, determines 512 the updated identifier for the buffered data, and updates 514 a copy of the identifier in the cache coherent space 204 of the electronic device 112, and the method 500 ends. In one embodiment, the buffer module 302, the update module 304, and the coherence notification module 306 perform the various steps of the method 500.

Figure 6:
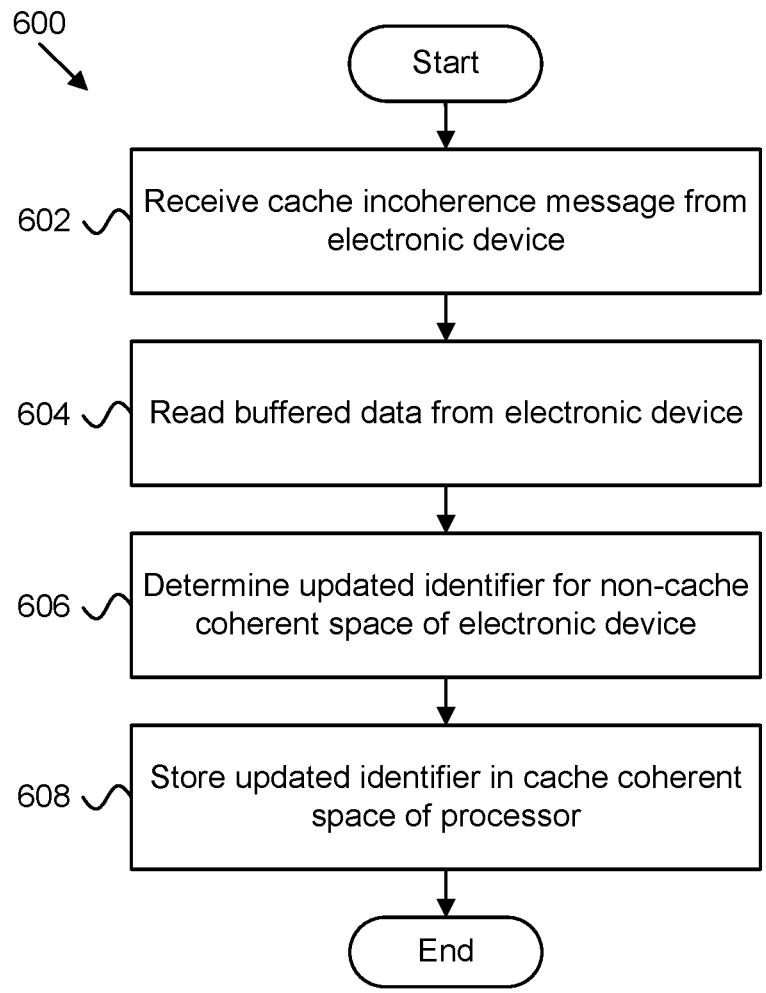
FIG. 6 is a schematic flow chart diagram illustrating one embodiment of a third method for cache coherency between a device and a processor.

FIG. 6 depicts one embodiment of a method 600 for cache coherency between a device and a processor. In one embodiment, the method 600 begins and receives 602 a cache incoherence message at the processor 104 from the electronic device 112. In further embodiments, the method 600 reads 604 buffered data from the electronic device 112, e.g., using memory mapped I/O. In certain embodiments, the method 600 determines 606 an updated identifier for the non-cache coherent space 202 of the electronic device 112. The updated identifier may include an identifier that refers to the next read location in the non-cache coherent space 202. In certain embodiments, the method 600 stores 608 the updated identifier in the cache coherent space 206 for the processor 104, and the method 600 ends. In one embodiment, the buffer module 302, the update module 304, and the coherence notification module 306 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a buffer module that buffers input/output ("I/O") data received at an electronic device in a non-cache coherent space of the electronic device, the non-cache coherent space comprising a circular buffer, the electronic device comprising a peripheral I/O device for sending and receiving I/O data to and from a processor communicatively coupled to the electronic device;
an update module that updates at least one identifier with respect to the buffered data, the at least one identifier stored in a cache coherent space of the electronic device, the at least one identifier comprising a first pointer that refers to a write location in the circular buffer such that data received at the electronic device is written to the write location in the circular buffer indicated by the first pointer, the update module updating the first pointer in the cache coherent space in response to the data being written to the write location; and
a coherence notification module that sends a notification message over a cache coherent interconnect protocol to the processor regarding a cache incoherence between the cache coherent space of the electronic device and a cache coherent space of the processor in response to the first pointer being updated, the cache incoherence indicating to the processor that data is available to be read from the circular buffer of the electronic device, wherein the notification message that is sent to the processor includes a copy of the first pointer that is updated in the cache coherent space of the electronic device such that the first pointer that is stored in the cache coherent space of the processor is updated with the copy of the first pointer that is received in the notification message to place the cache coherent space of the processor in cache coherence with the cache coherent space of the electronic device.

2. The apparatus of claim 1, wherein the coherence notification module notifies the processor of the cache incoherence by sending a message of the cache incoherence to the processor over a snooping protocol.

3. The apparatus of claim 2, wherein the message comprises a copy of the updated at least one identifier with respect to the buffered data in the non-cache coherent space of the electronic device.

4. The apparatus of claim 2, wherein the coherence notification module sends a copy of the updated at least one identifier to the processor in a message that is separate from the cache incoherence message in response to a request from the processor for the updated at least one identifier.

5. The apparatus of claim 1, wherein the at least one identifier further comprises a second pointer that refers to a read location in the circular buffer, the read location comprising data for the processor to read from the circular buffer.

6. The apparatus of claim 5, wherein the update module:
receives a cache incoherence message from the processor over a snooping protocol in response to the processor reading the data at the read location in the circular buffer and updating a copy of the second pointer in the cache coherent space of the processor, the updated second pointer referring to a next read location in the non-cache coherent space of the electronic device; and
updates the second pointer in the cache coherent space of the electronic device with the updated copy of the second pointer stored in the cache coherent space of the processor.

7. The apparatus of claim 1, wherein the buffer module buffers data received from the processor in the same non-cache coherent space of the electronic device that is used to buffer data intended for the processor.

8. The apparatus of claim 1, wherein the buffer module buffers data received from the processor in a second non-cache coherent space of the electronic device that is separate from the non-cache coherent space of the electronic device that is used to buffer data intended for the processor.

9. The apparatus of claim 8, wherein the update module:
receives a cache incoherence message from the processor over a snooping protocol in response to the processor updating a second at least one identifier with respect to the buffered data, the second at least one identifier stored in a second cache coherent space of the processor that corresponds to the second non-cache coherent space; and
updates a copy of the second at least one identifier stored in a second cache coherent space of the electronic device that corresponds to the second non-cache coherent space such that the second cache coherent space of the electronic device is coherent with the second cache coherent space of the processor.

10. The apparatus of claim 1, wherein the non-cache coherent space comprises a first-in-first-out stack, the at least one identifier comprising a first pointer that refers to a next read location in the stack for the processor to read data from, and a second pointer that refers to a next write location in the stack for the electronic device to write data to, the first and second pointers stored in the cache coherent space of the electronic device.

11. The apparatus of claim 1, wherein the electronic device comprises a peripheral component interconnect express ("PCIe") device.

12. The apparatus of claim 1, wherein the electronic device is selected from the group consisting of a network interface card, a video card, and a storage device.

13. The apparatus of claim 1, wherein the processor reads a copy of the updated at least one identifier is read from memory mapped I/O in response to the cache incoherence.

14. A method comprising:
buffering input/output ("I/O") data received at an electronic device in a non-cache coherent space of the electronic device, the non-cache coherent space comprising a circular buffer, the electronic device comprising a peripheral I/O device for sending and receiving I/O data to and from a processor communicatively coupled to the electronic device;
updating at least one identifier with respect to the buffered data, the at least one identifier stored in a cache coherent space of the electronic device, the at least one identifier comprising a first pointer that refers to a write location in the circular buffer such that data received at the electronic device is written to the write location in the circular buffer indicated by the first pointer, the update module updating the first pointer in the cache coherent space in response to the data being written to the write location; and
sending a notification message over a cache coherent interconnect protocol to the processor regarding a cache incoherence between the cache coherent space of the electronic device and a cache coherent space of the processor in response to the first pointer being updated, the cache incoherence indicating to the processor that data is available to be read from the circular buffer of the electronic device, wherein the notification message that is sent to the processor includes a copy of the first pointer that is updated in the cache coherent space of the electronic device such that the first pointer that is stored in the cache coherent space of the processor is updated with the copy of the first pointer that is received in the notification message to place the cache coherent space of the processor in cache coherence with the cache coherent space of the electronic device.

15. The method of claim 14, wherein notifying the processor of the cache incoherence comprises sending a message of the cache incoherence to the processor over a snooping protocol, the message comprising a copy of the updated at least one identifier with respect to the buffered data in the non-cache coherent space of the electronic device.

16. The method of claim 14, wherein the at least one identifier further comprises a second pointer that refers to a read location in the circular buffer, the read location comprising data for the processor to read in response to the cache incoherence.

17. The method of claim 14, further comprising:
receiving a cache incoherence message from the processor over a snooping protocol in response to the processor reading the data at the read location in the circular buffer and updating a copy of the second pointer in the cache coherent space of the processor, the updated second pointer referring to a next read location in the non-cache coherent space of the electronic device; and
updating the second pointer in the cache coherent space of the electronic device with the updated copy of the second pointer stored in the cache coherent space of the processor.

18. The method of claim 14, further comprising:
buffering data received from the processor in a second non-cache coherent space of the electronic device that is separate from the non-cache coherent space of the electronic device that is used to buffer data intended for the processor;
receiving a cache incoherence message from the processor over a snooping protocol in response to the processor updating a second at least one identifier with respect to the buffered data, the second at least one identifier stored in a second cache coherent space of the processor that corresponds to the second non-cache coherent space; and
updating a copy of the second at least one identifier stored in a second cache coherent space of the electronic device that corresponds to the second non-cache coherent space such that the second cache coherent space of the electronic device is coherent with the second cache coherent space of the processor.

19. The method of claim 14, further comprising reading, by the processor, a copy of the updated at least one identifier from memory mapped I/O in response to the cache incoherence.

20. A program product comprising a computer readable storage medium that stores code executable by a processor, the executable code comprising code to perform:
buffering input/output ("I/O") data received at an electronic device in a non-cache coherent space of the electronic device, the non-cache coherent space comprising a circular buffer, the electronic device comprising a peripheral I/O device for sending and receiving I/O data to and from a processor communicatively coupled to the electronic device;
updating at least one identifier with respect to the buffered data, the at least one identifier stored in a cache coherent space of the electronic device, the at least one identifier comprising a first pointer that refers to a write location in the circular buffer such that data received at the electronic device is written to the write location in the circular buffer indicated by the first pointer, the update module updating the first pointer in the cache coherent space in response to the data being written to the write location; and
sending a notification message over a cache coherent interconnect protocol to the processor regarding a cache incoherence between the cache coherent space of the electronic device and a cache coherent space of the processor in response to the first pointer being updated, the cache incoherence indicating to the processor that data is available to be read from the circular buffer of the electronic device, wherein the notification message that is sent to the processor includes a copy of the first pointer that is updated in the cache coherent space of the electronic device such that the first pointer that is stored in the cache coherent space of the processor is updated with the copy of the first pointer that is received in the notification message to place the cache coherent space of the processor in cache coherence with the cache coherent space of the electronic device.

* * * * *